Aug. 4, 1964

H. A. FERRIS 3,142,982

TAKE-OFF MONITOR

Filed July 30, 1954

Inventor
H. A. Ferris
By Fetherstonhaugh & Co.
Attorneys

Inventor
H. A. Ferris
By Fetherstonhaugh Co.
Attorneys

United States Patent Office

3,142,982
Patented Aug. 4, 1964

3,142,982
TAKE-OFF MONITOR
Harold Asaph Ferris, St. Lambert, Quebec, Canada, assignor to Canadian Marconi Company, Montreal, Quebec, Canada
Filed July 30, 1954, Ser. No. 446,703
Claims priority, application Canada Sept. 23, 1953
7 Claims. (Cl. 73—178)

The present invention relates to aircraft instrumentation, and particularly to such instrumentation as indicates aircraft performance during the take-off run.

Objects of the invention are to supply the pilot or aircrew, during the take-off procedure, with information on take-off performance that has hitherto been unavailable and to provide a simple apparatus, suitable for installation on any aircraft, which will present a positive indication of any performance abnormality during take-off.

Rules and regulations have been set up by the various regulator aviation bodies in respect to the necessary lengths of runway required for the operation of various types of aircraft. The stipulated runway length is such that if a normal take-off is not achieved, that is, if the aircraft has not yet attained a preassigned speed after reaching a predetermined point on the runway known as the "decision point," there still remains sufficient length of runway to bring the craft to a safe stop. A factor of safety is, of course, included so that deviations from normal take-off performance may be accommodated. In addition to this factor of safety included in the runway length, off-weighting regulations, frequently in chart form, have been evolved whereby a reduction in load is made in accordance with the deviation from normal of certain factors affecting take-off performance. Among the known factors are such meteorological conditions as barometric pressure, wind velocity, temperature, and humidity.

Despite the above precautions fatal crashes resulting from "over-running" of the runway continue to occur from time to time. More frequent are those occasions where a successful halt is achieved only at the expense of violent braking with its concomitant excessive stress and strain on the aircraft, and ill effects on passenger morale. In view of this it is evident that there may at times be combinations of adverse factors which are not capable of being correctly assessed by present methods. For instance, it is doubtful if accurate assessment of the effects due to deviations from the normal runway surface conditions could be made before the take-off run starts. In the case of slush on the runway, the amount may quite possible be different at different positions along the runway length. Again, the softening of an asphalt runway surface due to the heat of the sun is known to have a considerable effect on the ground friction forces. It appears impractical to try and measure such factors and insert them in an off-weighting chart. These and other factors may change unpredictably after the start of the take-off procedure. For instance a tire may go soft, a brake may seize, or some other structural defect may develop.

It is therefore evident that with presently used methods to ensure safety during the take-off procedure the pilot of an aircraft is called upon to exercise considerable judgment. He has the engine operation indicators, an air-speed indicator, visual reference to the runway, and possibly a take-off indicator which shows the extent of lift on the airfoil members. He is presumed to be experienced in the operation of the aircraft concerned and hence can sense the various intangible factors embraced by the term "feel of the ship." Despite such aids however, situations do occur, wherein various factors affecting take-off performance combine in such a way that accurate assessment of their combined values cannot be made by the pilot. This is a marginal area of operation since gross deterioration in performance would soon be percived by the pilot. Hence it is not until he reaches nearly take-off speed that a pilot will realize that a successful take-off is not possible and it is at this critical juncture with the end of the runway rapidly approaching, that the pilot must decide whether he will continue with the take-off effort, thus increasing the hazard of a serious accident, or will attempt to stop. Neither is a desirable choice to the pilot. The former may lead to a disastrous crash, the latter to disruption of the schedule, a mix-up in airport operations, passenger fear and resentment, strain and possible damage to the undercarriage, as well as raising some question as to whether or not the pilot had been overcautious.

Here it should be noted that in the case of jet propelled aircraft the "feel of the ship" is so different from that of the conventional propeller fitted aircraft that some pilots claim that this "feel" is missing entirely. In any case the take-off characteristics of jet propelled aircraft are so different from those of the conventional aircraft that the present combination of instrumentation and pilot judgment have been proved inadequate in a number of take-offs under apparently normal conditions.

A basic object of this invention, therefore, is to greatly reduce the possibility of pilot misjudgment during the take-off proceedings by the provision of accurate overall performance data during take-off. The invention provides indication of any abnormalities in performance throughout the take-off proceedings thus enabling the pilot to take immediate action, usually early in the take-off run and hence when travelling at a moderate and readily maneuverable speed. The invention serves, in fact, as a predictor as to whether or not any take-off proceeding will be successful.

According to the invention a take-off monitor system for use in aircraft comprises means to develop a first force which is a predetermined function of the speed of the aircraft, means to develop a second force which is a predetermined function of the acceleration of said aircraft, and means to combine said first and second forces additively, and means to present an indication of said combined forces to the pilot and/or aircrew of said aircraft during the take-off procedure.

The invention will be described with reference to the accompanying drawings in which.

Let us consider the forces acting upon an aircraft during the take-off run from the view point of the Newtonian laws of motion. At the start of the take-off procedure, while the velocity is zero, the airfoil surfaces are inactive. It therefore follows that the thrust developed by the power plant is expended in overcoming ground friction and in imparting acceleration to the craft. As the take-off run proceeds the airfoil surfaces develop increasing drag with increasing speed. This factor absorbs an increasingly large percentage of the power developed by the power plant, and the acceleration falls off. Eventually all available thrust will be absorbed by drag and resistance forces, the maximum speed will be attained, and the acceleration will be zero. Normally, well before this the aircraft will have become airborne.

This situation may be expressed by the following equation:

(1) $$T = R + Ma$$

where

T is the thrust
R is the total drag and resistive force
M is the mass being accelerated
$a$ is the acceleration.

Consider the manner in which the individual parts of this equation are affected during the take-off procedure. The thrust T will change to some extent with increase of speed. The manner in which it does, and the extent of the change will depend upon the particular type of craft. The effect may be insignificant in one type of aircraft while in another will require consideration. Let us say, however, that the thrust at any time equals the initial thrust less some function of velocity or $$T = T_0 - f_1(v)$$

The total resistive force is the sum of drag and ground friction forces. Drag is a function of velocity. The ground friction force is a function of the effective weight of the aircraft upon the landing gear, and this effective weight is governed by the lift which in turn is a function of velocity. Therefore $R = f_2(v)$.

Acceleration of course, being the time derivative of velocity, may be written $$a = \frac{dv}{dt}$$

It may be well to note at this point that the value to be used for the mass would normally be the product of the all-up weight of the aircraft divided by the force of gravity. It should be kept in mind, however, that a certain mass of air receives acceleration along with the aircraft. Generally this is a factor of importance only in the case of airships, that is, lighter-than-air craft, but it is conceivable that it could be of importance in some new type of aircraft.

Rewriting the previous equation in the terms as evaluated above we have:

(2) $$T_0 - f_1(v) = f_2(v) + M\frac{dv}{dt}$$

This equation may be rearranged by bringing together the terms involving the unspecified functions of velocity to give a new velocity function as follows:

(3) $$T_0 = f(v) + M\frac{dv}{dt}$$

Figure 1:
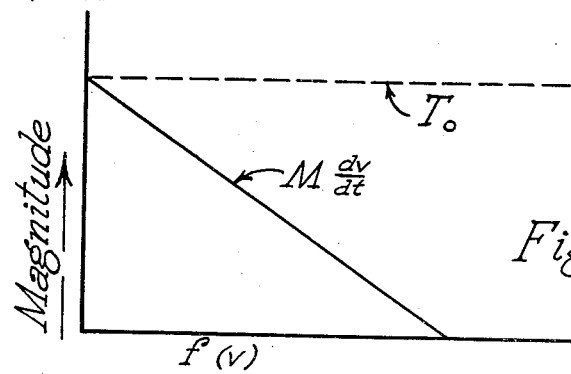
FIGURE 1 is a chart used to explain the principles upon which the invention functions.

In normal take-off runs by any one type of aircraft the factors $T_0$, $f$ and M are always the same. (If they are not, the take-off performance by definition is not normal.) It is therefore possible, by taking measurement, to establish the precise values of all factors of Equation 3 for normal take-off runs by any particular type of aircraft. This relationship may be expressed in the form of a chart such as that shown in FIGURE 1 where $$M\frac{dv}{dt}$$

and $T_0$ are plotted as functions of the experimentally established velocity dependent factor $f(v)$. Now before any take-off run is started, M is known, being a function only of the all-up weight of the craft which will have been measured. The operation of the aircraft power plant will also have been checked just before the start of the take-off run so that it will be known that $T_0$ is normal. If then during the run we were to measure the velocity $v$, operate upon it according to the function $f(v)$, measure the acceleration at the same time, and combine them additively, we know that we should obtain a resultant constant value of a known amount. If this resultant value is different from the established value it is then known that some factor or factors which affect take-off performance are different from normal. We do not know what these factors may be, nor is the pilot necessarily interested at this time. His immediate requirement is to be warned as soon as possible if there is any abnormality in take-off performance.

Figure 2:
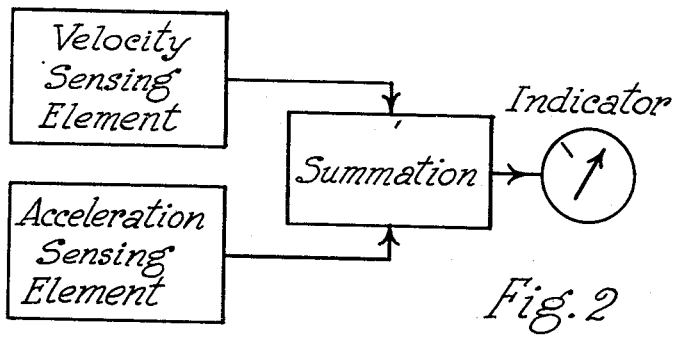
FIGURE 2 is a block diagram showing the essential elements comprising the system of this invention.

FIGURE 2 shows the essential elements of the system according to this invention. Since the elements of the system may take any of a wide variety of forms, mechanical, electrical, electronic, or a combination thereof, the drawing is in block form. A velocity sensing element generates a force, mechanical, electrical, hydraulic, or other which is the desired function of velocity. To this force is added that of an acceleration sensing element. This latter force is proportioned in accordance with the mass M of the aircraft. The sum of the two forces is then applied to actuate an indicator which in itself may have a variety of forms. It could, for instance, be a simple dial, as illustrated, with a mark showing the normal value. It could take the form of, say, a red and a green lamp, the red lamp lighting when performance is below normal. It could be, perhaps in combination with a dial or lights, a horn which would give audible warning. If found desirable from an operational point of view, the apparatus could readily be made to initiate the actions of shutting off power and braking. In this case the pilot would be completely relieved of making the decision as to stopping.

As indicated above the determination of the velocity function $f(v)$ for any aircraft type is properly a question of experimentation. The form of the velocity function generator will depend to a great extent upon the complexity of the required function. Simple mechanical methods will suffice in many cases; in others it may be desirable to utilize electronic methods. However, measurements on a number of aircraft indicate that, with very high precision, this function is simply a constant times the square of the velocity. This permits of the very simple embodiment of the invention shown in FIGURE 3.

Figure 3:
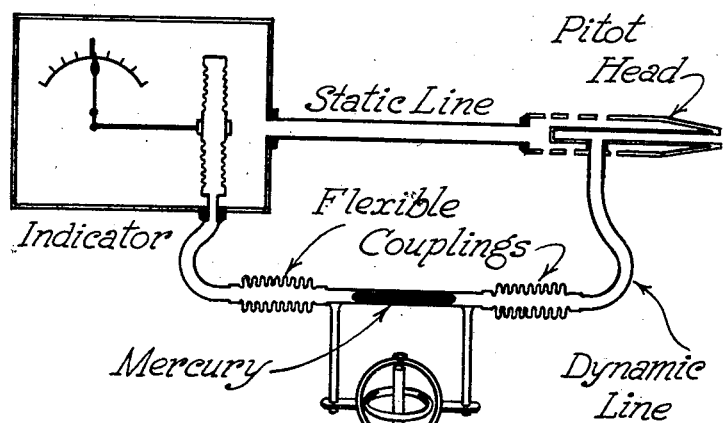
FIGURE 3 is a diagram showing a preferred and simple embodiment of the invention.

In FIGURE 3 will be seen the elements of an ordinary air-speed indication system; a Pitot head, static and dynamic air lines, and an aneroid barometer type of indicator. As is known, the differential air pressure developed on the indicator bellows is a function of velocity squared. For use in the embodiment of FIGURE 3 it is, therefore, only necessary to modify a normal air-speed indicator so that it will read directly with pressure, that is as velocity squared rather than as velocity. To obtain a force on the indicator proportional to acceleration a column of mercury is inserted in the dynamic air line. This column is placed parallel to the longitudinal axis of the aircraft and is kept in a horizontal position by a gyroscope, flexible couplings being used in the airline. By selecting the proper weight of mercury the mass factor of the aircraft is taken into account.

It is to be noted that by a slight variation in the embodiment shown in FIGURE 3 compensation for longitudinal tilt of the aircraft about the horizontal need not necessarily be achieved by gyro-stabilization of the mercury column itself. The gyroscope may be made to operate on the indicator, say by rotating the dial relative to the pointer pivot, according to the degree of longitudinal tilt from the horizontal.

It will be seen that the embodiment of the invention as shown in FIGURE 3 is simple and straightforward, making use of thoroughly proven aircraft instrument elements. It is obvious, however, that other well known means could be used if desired. For instance the force due to acceleration could be attained, not by the use of an accelerometer using a mercury column but by one using a strain gauage producing an electrical output. This output, amplified if necessary, could be added to the electrical output of a generator driven by a properly located airscrew and the sum applied to an indicating meter and/or relay to control indicator lamps, etc.

It should also be noted that an accelerometer as such, which is influenced by the earth's gravitational field, need not be employed. The acceleration function may be obtained by measuring the rate of change of velocity, that is, by measuring $$\frac{dv}{dt}$$

Figure 4:
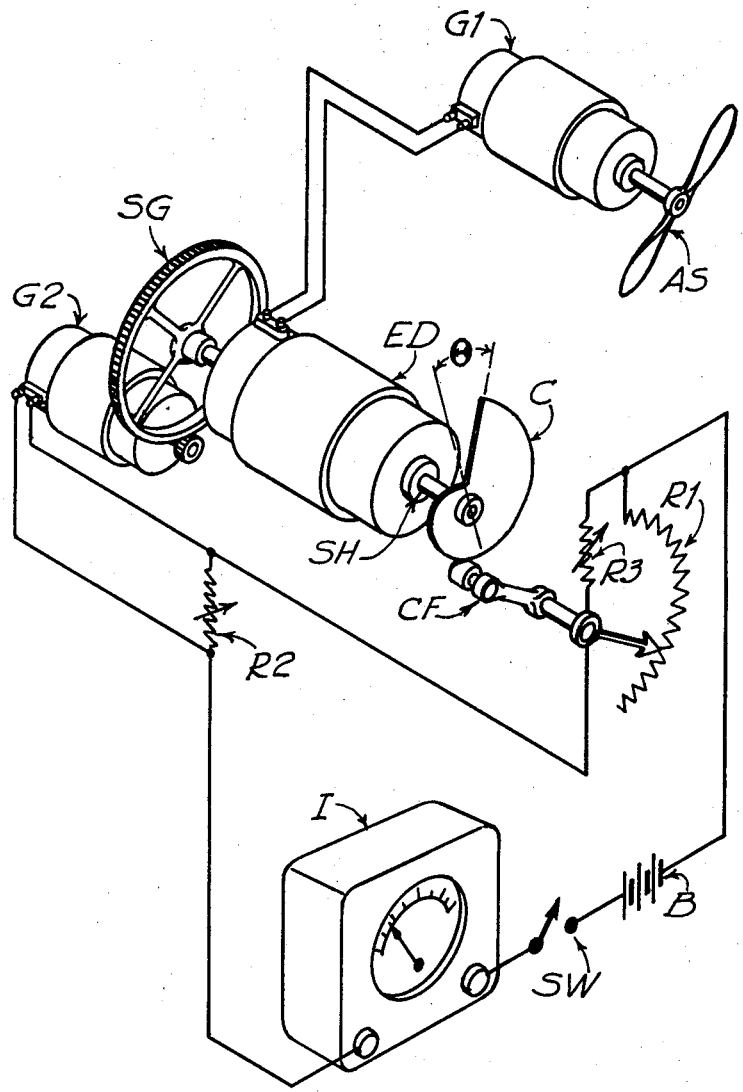
FIGURE 4 shows an embodiment differing from that of FIGURE 3 in that it may utilize a force having a different function of velocity, and that the force due to acceleration is developed in a different manner.

In this manner the need for gyro-stabilisation of the accelerometer is obviated. FIGURE 4, by way of example and in elementary form, sets forth an embodiment according to the invention which employs this principle and which also permits the generation of any desired velocity function.

In FIGURE 4, a generator G1 is suitably driven as by the airscrew AS shown, which is located properly in the air stream. The electrical output of generator G1 is applied to an electrodynamometer, ED. The combination constitutes an electrical tachometer so calibrated that the output shaft SH of the dynamometer takes up an angular position $\theta$ which is proportional to air speed. The angular position $\theta$ therefore equals some constant times the velocity, or $\theta = K_1 v$. The electrodynamometer is mechanically coupled to the generator G2 through step-up ratio gearing SG. Hence, with any change of velocity the generator G2 will produce an electrical output. This output can therefore be made to equal a constant times the time rate of change of velocity, or $$K_2 \frac{dv}{dt}$$

A cam C is attached to the shaft SH of the electrodynamometer to actuate the control arm of a variable resistor R1 by means of the cam follower linkage CF. The profile of the cam C may be chosen so that, by its action on the variable resistance R1, the value of the latter may be any desired function of the shaft displacement $\theta$, and hence of velocity. In operation, therefore, the value of $R1 = f(v)$.

The output of the generator G2 is connected in series with the variable resistance R1, a battery B, and an indicator I. Calibration controls for generator G2 and variable resistance R1 are provided. In the embodiment of the invention shown they take the form of variable resistances R2 and R3 shunted across the two components. An on-off switch, SW, may be provided.

The embodiment of the invention shown in FIGURE 4 has a number of practical advantages. The power requirements of the velocity function generator and the acceleration function generator may be easily met by suitable choice of the airscrew driven electrical generator. By the use of different cams, C, one basic instrument may be readily adapted for use in different types of aircraft.

The application of the force $f(v)$ to the indicator need not involve the use of a variable resistor R1. The action could be accomplished by variation of the mutual induction in a transformer, the battery B being replaced by an alternating current source. In such a case the indicator would presumably have separate windings for the application of the forces representing $f(v)$ and $$\frac{dv}{dt}$$

Or $f(v)$ could be applied through a direct mechanical linkage. The possibility of developing a suitable $f(v)$ in some cases by mechanical linkage between the shaft SH and the indicator will also be recognized.

While the method used for developing the $$\frac{dv}{dt}$$

force that is shown in the embodiment of FIGURE 4 is straightforward and easily accomplished by the use of available components, those skilled in the art of instrument design will recognize that a variety of other means could be employed without altering the inventive concept here set forth. It will be noted that a system according to the embodiment of FIGURE 4 is particularly well suited to the use of servomechanisms therein whereby a high degree of precision may be readily achieved.

In the foregoing disclosure the basic elements of two practical embodiments of this invention have been described. In the discussions thereon a number of possible variations have been mentioned. It would not serve to increase the understanding of the basic concept of the invention to attempt to portray the wide variety of combinations of known elements and known art that could be employed, and to avoid undue prolixity such has not been done. It will be evident to those skilled in the art that the basic concept of this invention may be applied through the use of a variety of ways not directly pointed out in the disclosed embodiments or discussion thereon, and it is to be understood that the scope of the invention is not limited to these embodiments which are used here only to illustrate the novel concept involved.

What is claimed is:

1. Apparatus aboard an aircraft for monitoring the performance of said aircraft during the take-off run comprising in combination; a first electric generator driven by means responsive to the flow of air past said aircraft, said generator producing an output proportional to the forward speed of said aircraft, an electrodynamometer device responsive to the output of said generator and effecting a displacement of a first member proportionate in amount to said generator output, a second member adapted upon translation to control the magnitude of a first electrical quantity, a mechanical linkage coupling said first and second members and adapted to translate said second member in accordance wtih a predetermined law; a second electrical generator driven by said electrodynamometer device actuated first member and producing a second electrical quantity which is proportional to the time rate of change of displacement of said first member; and indicating means to which are applied said first and second electrical quantities said indicating means being arranged to indicate when the sum of said first and second electrical quantities is less than a predetermined minimum.

2. Apparatus as set forth in claim 1 wherein said mechanical linkage coupling said first and second members comprises a cam whose profile is selected to provide a translation relationship between said first and second members in accordance with said predetermined law.

3. Apparatus aboard an aircraft for monitoring the performance of said aircraft during the take-off run comprising in combination, an airspeed responsive system arranged to provide a response which is a predetermined function of the forward airspeed only of said aircraft, an acceleration responsive system arranged to provide a response which is a predetermined function of the acceleration of said aircraft in the horizontal plane in the forward direction only, response summation means to which are applied said airspeed response and said acceleration response, and indicating means responsive to said summation means and adapted to indicate when the response of said summation means is less than a predetermined minimum.

4. Apparatus aboard an aircraft for monitoring the performance of said aircraft during the take-off run comprising in combination; airspeed measuring apparatus arranged to develop a response which is a predetermined function of the forward airspeed only of said aircraft; an acceleration measuring system comprising a device developing an output which is directly proportional to the forward airspeed only of said aircraft, and output measuring means fed with said output and arranged to develop a response which is a predetermined function of the time rate of change of said output proportional to forward airspeed; response summation means to which are applied said airspeed response and said acceleration response, and indicating means responsive to said summation means and adapted to indicate when the response of said summation means is less than a predetermined minimum.

5. Apparatus aboard an aircraft for monitoring the performance of said aircraft during the take-off run comprising in combination; an airspeed measuring device arranged to develop a response which is a predetermined function of the forward airspeed only of said aircraft; gyroscopic means providing a reference datum of the horizontal plane; an accelerometer developing in conjunction with said gyroscopic means a response which is a predetermined function of the forward acceleration in the horizontal plane only of said aircraft; response summation means to which are applied said airspeed response and said acceleration response, and indicating means responsive to said summation means and adapted to indicate when the response of said summation means is less than a predetermined minimum.

6. Apparatus aboard an aircraft for monitoring the performance of said aircraft during the take-off run comprising in combination, an airspeed responsive system of the Pitot tube type arranged to respond only to the forward airspeed of said aircraft and to deliver to a fluid pressure transmitting line fluid at a pressure which is proportional to the square of the forward airspeed; an accelerometer system comprising a mounting means stabilized in the horizontal plane by a gyroscope, a fluid chamber mounted in said mounting means said chamber being connected to said fluid pressure transmitting line and having a wall portion of given mass translatable against restraining means in response to the fluid pressure in said chamber and also in response to forward only accelerating forces; and indicating means responsive to movement of said restraining means and adapted to indicate when the force developed in said restraining means by the translation of said wall portion is less than a predetermined amount.

7. Apparatus for monitoring the performance of an aircraft during the take-off run comprising an airspeed responsive system arranged to provide a response which is a predetermined function of the forward airspeed only of said aircraft, an acceleration responsive system arranged to provide a response which is a predetermined function of the acceleration of said aircraft in the horizontal plane in the forward direction only, an indicator, and means operatively interconnecting said airspeed responsive system and said acceleration responsive system with said indicator to apply the outputs of said systems to the indicator so that the indicator indicates the summation of the outputs.

References Cited in the file of this patent

UNITED STATES PATENTS

| | | |
|---|---|---|
| 1,451,923 | Pierce | Apr. 17, 1923 |
| 1,885,578 | Boykow | Nov. 1, 1932 |
| 2,176,807 | Wunsch | Oct. 17, 1939 |
| 2,182,706 | Shanley | Dec. 5, 1939 |
| 2,277,625 | Baynes | Mar. 24, 1942 |
| 2,488,286 | Glenny | Nov. 15, 1949 |
| 2,665,860 | Bancroft | Jan. 12, 1954 |